April 7, 1953     J. D. BEETS     2,634,161
SUN VISOR
Filed March 24, 1950     2 SHEETS—SHEET 1
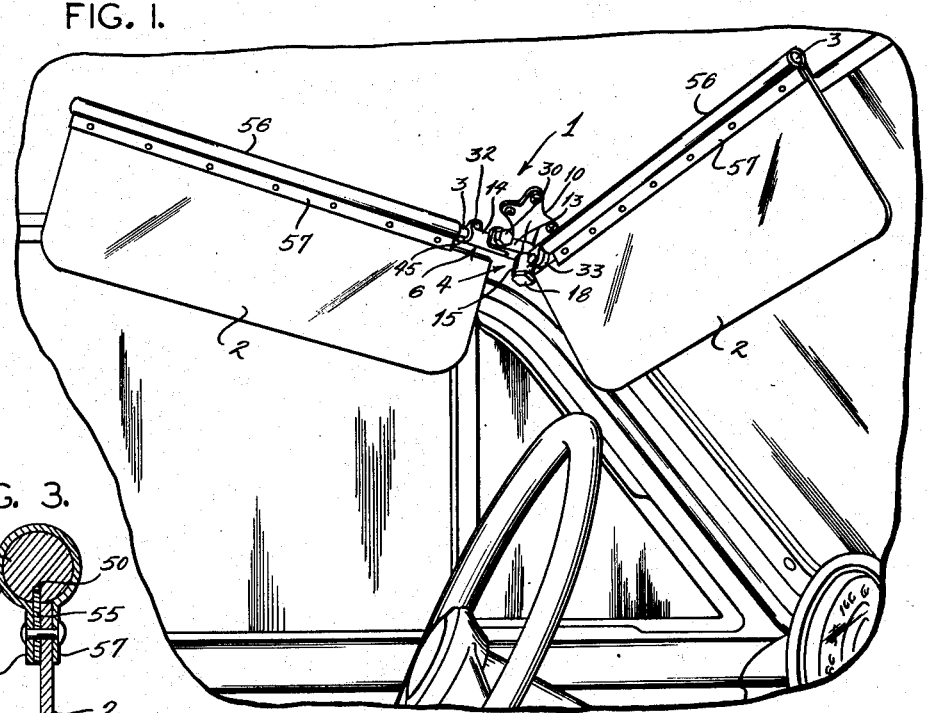
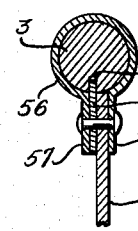
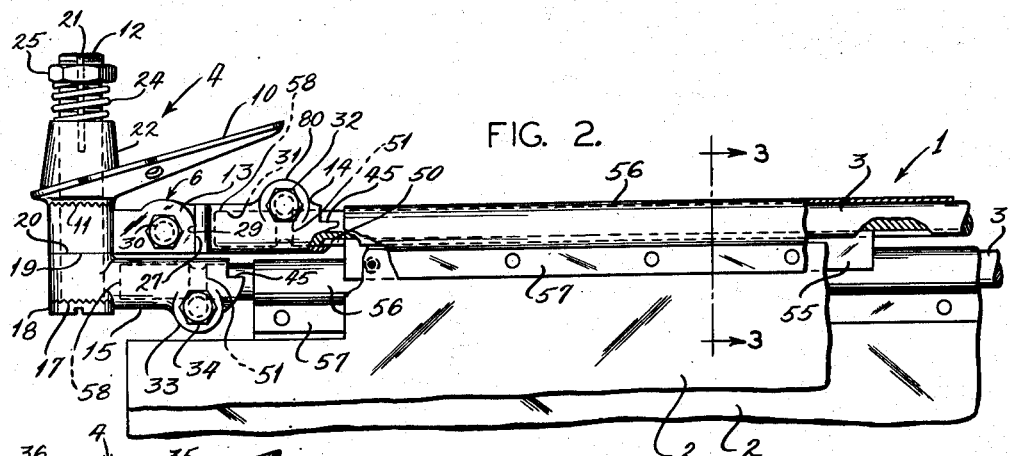
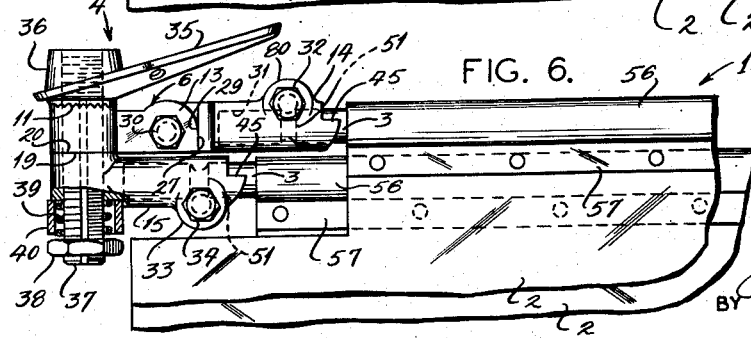
INVENTOR
JAMES D BEETS
BY
ATTORNEYS April 7, 1953            J. D. BEETS            2,634,161
SUN VISOR
Filed March 24, 1950            2 SHEETS—SHEET 2
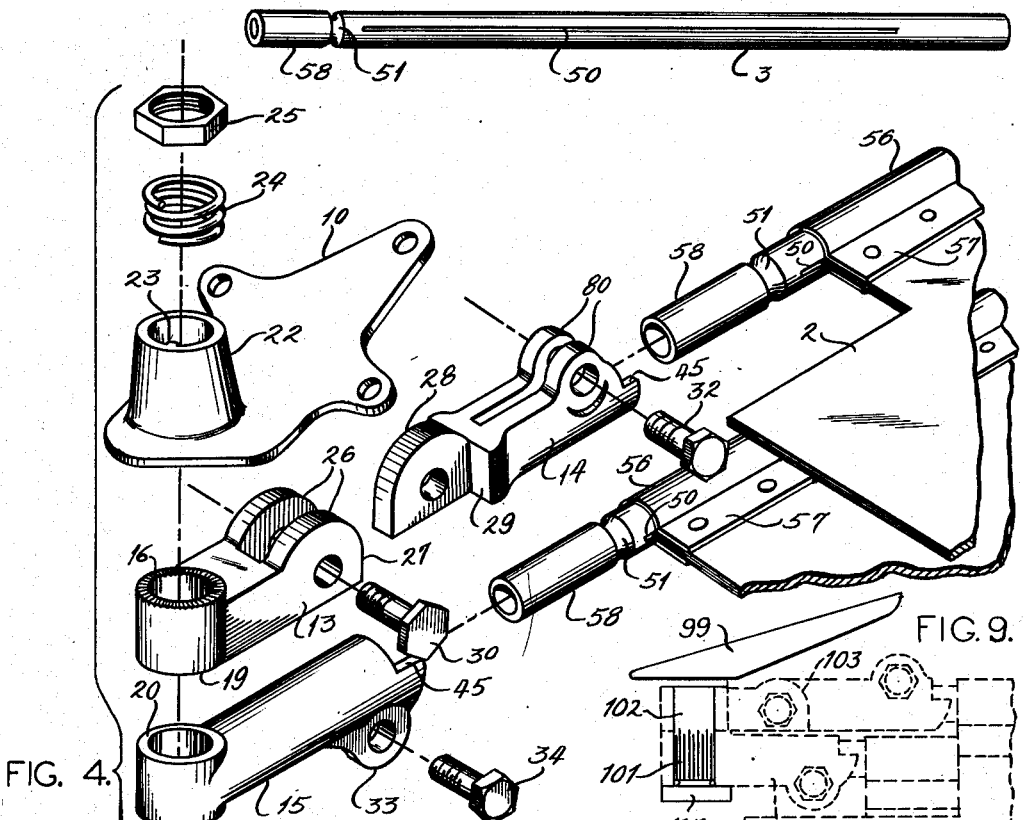
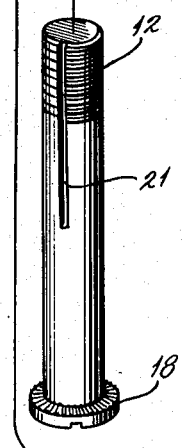
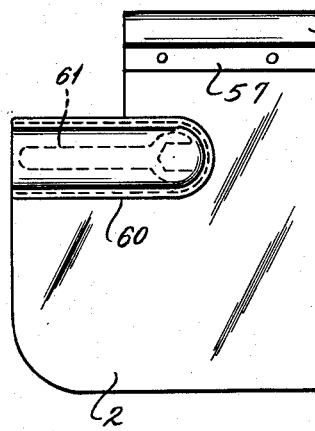
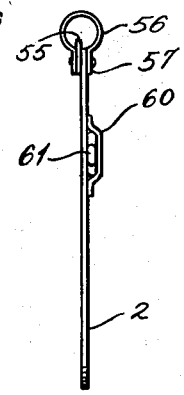
INVENTOR:
JAMES D. BEETS
BY
ATTORNEYS.

Patented Apr. 7, 1953

2,634,161

UNITED STATES PATENT OFFICE 2,634,161

SUN VISOR

James D. Beets, Jefferson City, Mo., assignor of forty per cent to Aubrey R. Hammett, Jr.

Application March 24, 1950, Serial No. 151,789

6 Claims. (Cl. 296—97)

This invention relates to sun visors and particularly to sun visors for use in vehicles.

One of the objects of this invention is to provide a sun visor having two separate, independently adjustable shades. Another object is to provide a sun visor in which the shade may be positively retained in its upwardly folded position. Another object of this invention is to provide a visor having an extensible shade of an improved construction.

Another object is to provide a visor having in its shade a tool retaining pocket.

Another object is to provide a visor having separate shades which may be folded compactly in stacked relationship.

Further objects will be apparent in the art in the light of the following specification, when read in connection with the drawing.

In accordance with an illustrative embodiment of this invention, a visor is provided having two independently adjustable shades carried by supporting members, at least one of which supporting members is capable of adjustment in a vertical plane. The shades are so constructed as to be foldable together in a space comparable with the space now occupied by a single shade, and are provided with means for positively maintaining the shades in their folded position. Improved means are provided for positively but slideably engaging the shades and their supporting members to prevent rotation of the shades about their supporting members, but to allow lateral extension of the shades. A pocket is provided in one of the shades, for holding an adjusting tool.

Referring now to the drawings:

Figure 1 is a view in perspective showing a visor, constructed in accordance with one embodiment of this invention, mounted in an automobile.

Figure 2 is a view in side elevation, of one embodiment of this invention, partly cut away.

Figure 3 is a sectional view taken along the line 3—3 of Figure 2.

Figure 4 is an exploded view, particularly showing details of a mounting bracket assembly constructed in accordance with one embodiment of this invention.

Figure 5 is a view in perspective of a shade supporting rod, constructed in accordance with one embodiment of this invention.

Figure 6 is a view in side elevation, partly cut away, of a visor constructed in accordance with another embodiment of this invention.

Figure 7 is a plan view of a shade member showing a tool-holding pocket, provided in accordance with one embodiment of this invention;

Figure 8 is an end view of the device shown in Figure 7; and

Figure 9 is a view in side elevation partly cut away of a bracket assembly constructed in accordance with still another embodiment of this invention.

Referring now to the illustrative embodiments shown in the drawings and, in particular, to Figure 1, a visor 1 is provided with a pair of shades 2. Shades 2 are supported by shade supporting rods 3 and are mounted for independent movement on bracket assembly 4. In the embodiment of bracket assembly shown in Figure 2 and in an exploded view in Figure 4, the bracket assembly consists of a fixed mounting plate 10, having a serrated surface 11 and carrying a shaft 12. Mounted for rotation on shaft 12 are upper side shade-supporting rod bracket 6 and lower front-shade-supporting rod bracket 15. Upper rod supporting bracket 6 consists of two bracket elements, shaft engaging element 13 and rod holding element 14. The upper surface of the upper rod-holding bracket element 13 is provided on its upper side with a serrated face 16 for engagement with the serrated surface 11 of fixed mounting plate 10. Lower rod-holding bracket 15 is provided on its lower side with a serrated face 17 for engagement with a serrated retaining member 18, carried by shaft 12. A smooth face 19 on the lower surface of the upper rod-holding bracket element 13 and a smooth face 20 on the upper side of the lower rod holding bracket 15 are provided for slideable engagement.

In the embodiment shown in Figures 2 and 4, the shaft 12 is provided with a keyway 21 and is threaded at its upper end. Fixed mounting plate 10 is provided with an upwardly extending sleeve member 22, having a fixed key 23 for engaging keyway 21 to prevent rotation of shaft 12. A spring 24 is positioned around shaft 12 and abutting the top surface of sleeve 22. A nut 25 serves to retain shaft 12 and to hold serrated retaining member 18, rod holding bracket 15, rod holding bracket element 13 and mounting plate 10 in tensioned engagement with one another.

Rod holding bracket element 13 is provided with a yoke 26, having a flat face 27. Upper rod-holding bracket element 14 is provided with a projection 28 adapted to closely fit within the yoke 26 of bracket element 13. Yoke 26 and projection 28 are drilled to receive a pivot 30 when assembled. A shoulder 29 on bracket element 14 is adapted to engage the flat face 27 of bracket element 13 to limit the downward rotation of bracket element 14 about the pivot 30. Upper bracket element 14 is provided at the end opposite the projection 28 with a slotted socket 31, adapted to receive an end of a shade supporting rod. The socket 31 is provided with drilled, upwardly-extending ears 80, one of which may be tapped, to receive rod-retaining and tightening bolt 32. Lower rod-holding bracket 15 is also provided with a slotted socket 33, provided with a tightening bolt 34.

In the embodiment of bracket assembly shown in Figure 6, a mounting plate 35 is provided with a short sleeve 36 within which a shaft 37 is secured. In this embodiment, the shaft 37 may be made integral with mounting plate 35. However, in Figure 6, sleeve 36 is internally threaded and shaft 37 is threaded to be screwed therein. Shaft 37 is also threaded at its lower end to receive a nut 38. A spring 39 is biased against a retaining cup 40, provided with serrations on its upper face. Retaining cup 40 is equipped with a key, not here shown, to engage a keyway in shaft 37, so as to prevent rotation of the retaining cup 40. Retaining cup 40 is so constructed as to conceal spring 39 when the bracket assembly is assembled. The rod-holding brackets 13, 14 and 15 of this embodiment are the same as those illustrated in Figures 2 and 4 and described.

In the embodiment of bracket assembly shown in Figure 9, the mounting plate 99 may correspond with either of the mounting plates shown in Figures 2 and 6. In this embodiment, a lower rod holding bracket 100 is splined as at 101 to a shaft 102 to secure the bracket 100 against rotation about the shaft 102. The bracket 100 carries the front shade supporting rod. Side shade supporting rod bracket 103 is similar to the corresponding shade supporting brackets of the embodiments shown in Figures 2 and 6, except that the serrations 11 of those embodiments may be omitted. Retaining means indicated generally as 105 are provided to retain the brackets 100 and 103 on the shaft 102. When the mounting bracket is of the type shown in Figure 2 of the drawing, the retaining means 105 may be fixed or the lower bracket 100 may even be made integral with the shaft 102. When the mounting plate 99 corresponds with the mounting plate 35 of Figure 6, a nut and spring arrangement similar to that shown in Figure 6 may be used since the splined portions 101 of the bracket 100 and shaft 102 allow axial movement of the bracket 100 along the shaft. An advantage of the splined arrangement is that the front shade may be adjusted to the particular automobile at the time the visor is installed and assembled.

In all of these embodiments, both lower rod-holding bracket 15 and upper rod-holding bracket element 14 are provided with shade supporting shoulders 45 extending toward the shade.

Referring now to Figure 5, shade-supporting rod 3 is provided with a longitudinal keyway 50 which, in the embodiment shown, does not run the full length of the rod. An annular groove 51 is provided near one end. In the embodiment shown, the rod 3 is made round in cross section.

Referring now to Figures 1, 2 and 3, shades 2 which may be made of any suitable material, are provided with a key 55 which, as shown in Figure 2, extends for only a portion of the length of the shade. Key 55 engages keyway 50 when the shade is assembled. A sleeve 56, having flanges 57, serves to hold rod 3, shade 2 and key 55 assembled in proper relationship. In the embodiment shown, sleeves 56, key 55 and shade 2 are secured by rivets through flanges 57.

The free end 58 of rod 3 fits snugly but revolvably within socket 31 of upper rod-holding bracket element 14 or socket 33 of lower rod-holding bracket 15. The free end 58 of rod 3 is so proportioned that when inserted within one of the rod-holding bracket sockets, the annular groove 51 of rod 13 is so positioned that rod-retaining and tightening bolts 32 and 34 fit therein to positively lock the rod 3 against transverse displacement. This is particularly shown in Figures 2 and 6.

In the embodiments shown in the drawing, threaded pivot 30 and rod-holding tightening bolts 32 and 34 are provided with uniform hexagonal heads. To facilitate adjustment of these elements, it is highly desirable that a suitable wrench be provided in an easily accessible place. To this end, a pocket 60 is provided in shade 2, as shown in Figures 7 and 8, for holding a suitable wrench 61.

The mounting plates with which this visor is provided are adapted to be used with any of the standard automobiles now in use. The embodiment of bracket assembly shown in Figures 2 and 4 is suitable for use in those vehicles having a sufficient space below the roof to accommodate the threaded portion of the shaft 12, nut 25 and spring 24.

The embodiment of mounting bracket assembly shown in Figure 6 is adapted for use in those vehicles in which the clearance above mounting plate is small.

The arrangement of the serrated faces on the rod-holding brackets, in connection with the tensioning means as described, allows either shade to be adjusted about the common shaft without disturbing the adjustment of the other shade, since the friction of the smooth faces 19 and 20 is negligible as compared with the resistance of turning the serrated surfaces against one another.

The positioning of the rod-retaining and tension bolts with respect to the annular groove 51 of rod 3 provides, as has been pointed out, a positive lock against transverse movement of the rod. As is hereafter described, the construction of the assembled shade is such that there can be no rotation of the shade about its supporting rod. Therefore, adjustment of the movement of a shade about the axis of its supporting rod depends upon the turning of the free end 58 of the rod 3 within the rod-holding bracket socket. Therefore, all tension against the rotation of the shade is controlled by the rod-retaining and tightening bolts 32 and 34. Also, the tensioning of the upward movement of the side shade about the pivot 30 is controlled by the adjustment of pivot 30.

The construction of the shade with rod 3, keyway 50, key 55, and sleeve 56 with flanges 57 has been described. When these elements are assembled, the key 55 engages keyway 50, while sleeve 56 snugly but slideably engages the rod 3. Key 55 extends for only a portion of the length of shade 2 from the side of the uppermost edge of that shade adjacent the free end 58 of rod 3. As can be seen in Figures 1, 2, 4, 6 and 7 in the embodiment shown, the upper edge of shade 2 is cut out so as to allow the use of a shade covering more area for a given length of rod. Key 55 also extends along only a portion of keyway 50. Thus it can be seen that shade 2 is extensible along rod 3 to the extent of the difference between the lengths of the key 55 and keyway 50. In the embodiment shown, since keyway 50 does not extend to the end of rod 3, a stop is formed limiting the extent to which the shade may be moved laterally along the rod. Flanges 57 serve a double purpose. Not only do they provide a reinforcing member and a means for securing the sleeve to the shade, but they are of such a width as to be engaged when the shade is in its upwardly folded unextended position, by the shade-supporting shoulder 45.

In operation when the visor is fully assembled and mounted in a vehicle, and particularly in the embodiment shown in which the side shade is supported above the front shade, the front shade may be adjusted much in the manner of sun shades now in use, except that when folded upwardly and pushed to its unextended position, it will be positively retained in that position by the shade-supporting shoulder. The upper shade may be moved into the side position, and may be adjusted to allow greater visibility by moving it upwardly about its pivot. This is particularly desirable in city driving where the glare may be bothersome but where overhead stop signs and the like make it necessary that the driver have greater visibility.

It can be seen that with the use of round supporting rods, and with the shade construction described, the shades may be folded upwardly together to occupy a space hardly greater than that occupied by a single sun shade, as commonly constructed.

Readily accessible points of adjustment of a uniform design have been provided in the embodiment of this invention described. The provision of a pocket in at least one of the shades, adapted to contain a wrench to fit these points of adjustment, helps to assure that the visor will be maintained in adjustment at all times.

Thus it can be seen that a simple, sturdy, efficient, convenient visor has been provided which allows for great flexibility of adjustment and arrangement, and provides a positive engagement against undesired movement when in an upwardly folded position.

While the embodiments shown in the drawings and described have been particularly adapted for use on the left side of the vehicle, looking forward, it can be seen that the device may equally well be mounted on the right side, particularly by providing the shade supporting shoulders, designated as 45 in the drawings, on the opposite side of the rod-holding brackets from that shown in the drawings.

Having thus described the invention, what is claimed and desired to be secured by Letters Patent is:

1. In a sun visor provided with a pair of sun shades, a bracket assembly for mounting said shades for independent movement about a common shaft, comprising a fixed mounting plate having a serrated section, a shaft carried by said mounting plate, an upper sun shade supporting bracket pivotally mounted on said shaft, said upper sun shade supporting bracket having a serrated upper face for engagement with the serrated section of the fixed mounting plate, and a smooth lower face, a lower sun shade supporting bracket pivotally mounted on said shaft, said lower sun shade supporting bracket having a smooth upper face and a serrated lower face, a lower sun shade supporting bracket retaining member provided with serrations for engagement with the serrated lower face of said sun shade supporting bracket, said retaining member being fixed against rotational movement with respect to the shaft, and tension means for holding the upper face of the upper sun shade supporting bracket and the serrated section of the fixed mounting plate, the smooth lower face of the upper sun shade supporting bracket and the smooth upper face of the lower sun shade supporting bracket, and the serrated lower face of the lower sun shade supporting bracket and the serrations of the lower sun shade supporting bracket retaining member in engagement with one another.

2. A sun visor, having a laterally slideable sun shade, comprising a shade supporting rod, said shade supporting rod being provided with a longitudinal keyway, a shade member having a key along at least a portion of one edge for slideable engagement with the keyway of said shade-supporting rod, a flanged sleeve member secured to said shade member along the key-bearing edge of said shade member, said sleeve member slideably engaging the shade-supporting rod, a substantially horizontal rod-holding bracket frictionally engaging an end of said rod, said rod holding bracket having a shoulder projecting in the direction of the rod offset from said rod for engagement with the lower flange of said sleeve member when the shade is in an upwardly folded, inwardly slid position.

3. A sun visor, comprising a pair of shade supporting rods, said rods being provided with longitudinal keyways, shades keyed to said rods for longitudinal sliding along said rods, brackets frictionally and revolvably engaging said rods, each of said brackets being provided with a shade-engaging shoulder, said brackets being pivotally mounted one above the other for independent movement on a common shaft, a shaft-supporting mounting plate, said shaft supporting mounting plate carrying a serrated face for engagement with serrations on the upper surface of the upper of the two mounting brackets, and a serrated member carried by said shaft for engagement with serrations on the lower face of the lower of the mounting brackets.

4. In a sun visor of the character described having rod supported front and side sun shades slideable on said rods and rotatable with respect to the axis of said rods, said sun shades being mounted for movement about a common shaft, a mounting bracket for said side sun shade comprising, a yoke member mounted for rotation on said shaft and provided with a flat face, a rod engaging member provided at one end with a projection for frictional and pivotal engagement within said yoke member and with a yoke-face engaging shoulder for limiting the downward rotation of said rod engaging member to a position substantially perpendicular to the axis of said shaft, and provided at its other end with adjustable rod retaining means, and with a shoulder positioned to extend beneath and to engage the sun shade when that shade is in an upwardly rotated position adjacent the rod-engaging member.

5. A sun visor comprising a rod-holding bracket, a shade-supporting rod mounted at one end on said bracket, a shade mounted on said rod, said shade being slideable inwardly toward and outwardly from said bracket along said rod and rotatable about the axis of said rod, and a shade-supporting shoulder on said bracket projecting in the direction of said rod and offset from said rod for engagement with the underside of said shade when said shade is in its inwardly slid, upwardly rotated position.

6. A sun visor having front and side shades mounted for rotation substantially about their upper edges, comprising a mounting plate, a shaft mounted thereon and depending therefrom, and front and side shade-supporting brackets mounted on said shaft, said side shade-supporting bracket being pivotally mounted on said shaft, jointed for movement of its shade in a substantially vertical plane and provided with a stop member at said joint to limit the downward movement of said shade to a position at which the upper edge of said shade is substantially perpendicular to the axis of said shaft.

JAMES D. BEETS.

REFERENCES CITED

The following references are of record in the file of this patent:

UNITED STATES PATENTS

| Number | Name | Date |
|---|---|---|
| 1,470,553 | Church | Oct. 9, 1923 |
| 1,521,378 | Latimer | Dec. 30, 1924 |
| 1,535,810 | Brey | Aug. 28, 1925 |
| 1,599,183 | Phillips | Sept. 7, 1926 |
| 1,898,276 | Van Dresser | Feb. 21, 1933 |
| 1,941,032 | Knowles | Dec. 26, 1933 |
| 2,207,668 | Huddings, Jr. | July 9, 1940 |
| 2,261,881 | Horstmann | Nov. 4, 1941 |
| 2,467,294 | Cochran | Apr. 12, 1949 |